United States Patent [19]

Moraru

[11] 4,145,270
[45] Mar. 20, 1979

[54] METHOD OF, AND APPARATUS FOR DRYING DAMP BASEMENTS

[75] Inventor: Dinu-Stefan Moraru, Bucharest, Romania

[73] Assignee: Institutul de Cercetari in Constructii Si Economia Constructiilor, Bucharest, Romania

[21] Appl. No.: 799,766

[22] Filed: May 23, 1977

[51] Int. Cl.² .............................................. B01D 13/02
[52] U.S. Cl. ................................ 204/180 R; 204/280; 204/284; 204/299
[58] Field of Search ................... 204/180 R, 299, 196, 204/283, 280, 284 M

[56] References Cited

U.S. PATENT DOCUMENTS

| 3,070,528 | 12/1962 | Lipcsey et al. | 203/180 R |
| 3,523,884 | 8/1970 | Bagno | 204/196 |
| 3,856,646 | 12/1974 | Morarau | 204/180 R |

*Primary Examiner*—Arthur C. Prescott
*Attorney, Agent, or Firm*—Karl F. Ross

[57] ABSTRACT

In a method and apparatus for drying damp basements by electroosmosis, the inner surface of the basement walls are coated with a plaster or multi-layered coating of an electrically conductive non-metallic composition, which forms an electrode to which positive voltage is fed by a number of grounds arranged around the walls of the basement and embedded in the earth. These second electrodes are fed a negative voltage from the D.C. power supply, while their number is determined by a particular current density measured at the interface of the walls and the positive electrode and the building-directed face of the negative electrodes.

10 Claims, 6 Drawing Figures

METHOD OF, AND APPARATUS FOR DRYING DAMP BASEMENTS

FIELD OF THE INVENTION

The present invention relates, in general, to a method of, and apparatus for, controlling dampness in basements, and, more particularly, to a method and apparatus for controlling dampness in basements by electro-draining, using the phenomenon of electroosmosis.

BACKGROUND OF THE INVENTION

Electro-draining methods, both active and passive, applied to damp basements, is known in the art and uses metal wire mesh vertically fastened to walls or wires placed in horizontal joints at 2–3 brick row centres, or embedded in standard plastering and functioning as positive electrodes. In all known systems, the ground plates, which function as negative electrodes, are made of metal.

Also known are chemical methods of water-proofing by brickwork grouting from the interior of the basements, as well as methods of shielding from the outside which make use of waterproofing materials grouted in the surrounding soil.

These methods present several disadvantages:

in the electroosmotic methods, the metal wire meshes or wires embedded in the plaster or in the joints are subject to anodic corrosion;

due to the lack of continuity of the anodes (be they meshes or wires) the electric field in the building's basement walls is not uniform so that seepage of moisture may develop between the wires;

the known methods are not concerned with limiting current density, a fact which may result in an increase of the corrosion phenomena, both anodic and cathodic; also, the use of metal cathodes (arounds) keeps the danger of cathodic corrosion ever present, which implies their periodic change (at less than 15 to 20 yr. intervals);

the known electro-draining methods have not concerned themselves with automating the equipment used so that it should operate only when the danger of capillary water invasion towards the interior of the building is detected;

the above-mentioned methods require complex technologies which entail high costs;

chemical methods do not, at present, guarantee a uniform penetration of the grouting materials; also, due to the nature of the materials used, they are very expensive;

the methods of sealing up the soil in view of shieding the buildings from the outside entail the use of great quantities of materials, as well as special equipment and trained operating personnel.

OBJECTS OF THE INVENTION

It is therefore an object of the present invention to provide an improved method and apparatus for electroosmotic draining which will prevent the electrodes from corroding.

It is another object of the invention to provide a uniform electric field in the anode to prevent moisture seepage.

It is still another object of the invention to provide an electro-draining system which is inexpensive and maintenance free.

SUMMARY OF THE INVENTION

This invention obviates these disadvantages as the method it recommends uses either a plaster based on cement and electro-graphite, or a coating based on a polymer emulsion in water and colloidal graphite, applied on the interior face of the basement wall lacking waterproof insulation, which is to be electro-drained. Both plaster and coating function as positive electrodes and are coupled with grounds placed outside the building and made of a mixture of cement and electro-graphite in 1:3 volumetric proportion, poured in hand or mechanically bored holes of about 4 in. diam; these grounds work as the negative electrodes. In order to secure an outward-directed horizontal electroosmotic transport of moisture, to elude the corrosion phenomena to the utmost, and to achieve a competitive technical and economic efficiency, the operation of the system stipulates the restriction of the current density, both at the bounding surface between the current-carrying plastering or coating and the wall, and at the lateral face of the grounds (i.e. anode and cathode), according to the relationship:

$$j_p \leq 10^{-4} \, (A/cm^2)$$

where $j_p$ is the building-directed current density on the face of the grounds (in the case of a circular section grounds corresponding to a semi-circle);

$$j_t \leq 0.25 \times 10^{-4} \times t^{-1} \, (A/cm^2)$$

where $j_t$ is the current density on the bounding surface between the wall and the current-carrying plastering or coating; t(cm) is the thickness of the wall to be drained.

The positive electrode paste consists of:

when applied as plaster: a mixture of cement and electro-graphite in 1:3 volumetric proportion, including the quantity of water needed to obtain an easily handled paste not thicker than 1 cm;

when applied as coating: a volume-batched mixture of 4 parts colloidal graphite, 1 part a 25 percent aqueous polymer emulsion, and up to 2 parts mixing water. Four coats of this mixture are applied either by spraying, or by brushing on a strongly scraped and cleaned wall.

Application of voltage to these types of electrodes forming a plane may be made through either graphite stick contacts provided with metal caps to which insulated wires are welded, or corrosion-proof wire-mesh strips or metal ribbons; either type is embedded in the plaster or covered with the coating, as the case may be.

When the floor of the basement lacks horizontal water proof insulation, capillary lift is observed, and the system described above for electro-draining of laterally intruded water may be combined with one of the systems of compact or hollow cylindrical electrodes set in holes drilled in the interior face of the walls just above floor level; these electrodes are made of cement and electro-graphite in 1:3 volumetric proportion. They may be positively charged, so as to ensure the electroosmotic transport of water to the grounds of the system without the use of any conductor if their basement end is directly embedded in the current-carrying plaster or coating which functions as the positive pole of the system for the lateral electro-draining of water.

The apparatus for basement electro-draining, either horizontal electro-draining alone, or horizontal and vertical electro-draining combined, is supplied with current by using transistorized rectifiers of such dimensions and number as would just meet the conditions of current density per electrode sufficient to ensure their operation as prescribed.

BRIEF DESCRIPTION OF THE DRAWING

The above and other objects, features and advantages of the present invention will become more apparent from the following description, reference being made to the accompanying drawing, in which.

SPECIFIC DESCRIPTION

Figure 1:
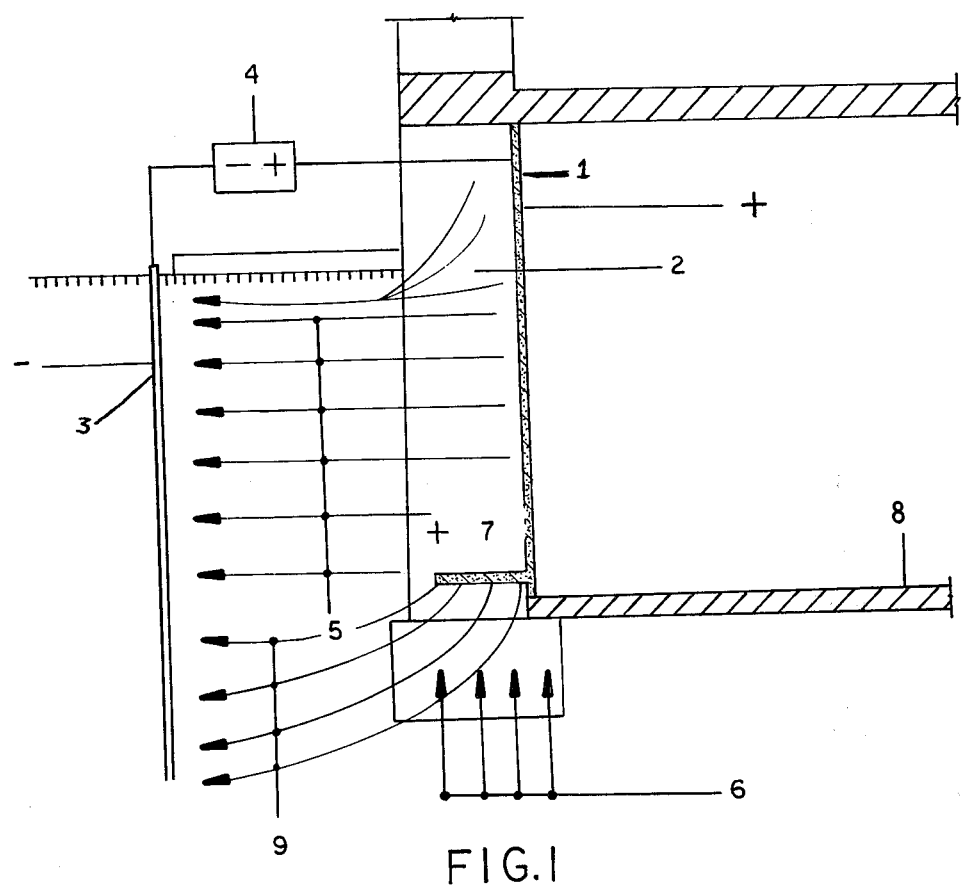
FIG. 1: is a transverse section in diagrammatic form, of an external basement wall for whose drying a current-carrying plaster or coating is applied.

The method of drying damp basements lacking vertical waterproof insulation consists of a plaster or coating 1 functioning as a positive electrode when applied to the interior face of a basement wall 2 and a system of ground plates 3 functioning as negative electrodes and placed outside the building according to the latter's location.

The plaster or coating 1 and the grounds 3 are permanently connected to a D.C. source 4, so dimensioned and located as to curb the electro-capillary migration of the water which tends to penetrate laterally into the basement and to reverse its migration, from the wall 2 to the grounds 3 along parallel lines of flow 5. To do so it is recommended that commercially available 12-24 V and maximum 4 any transistor battery-charging rectifiers directly connected to the 110/220 V and 50 Hz mains be used. The accidental capillary lift 6 that may concomitantly occur can be controlled with one of the systems using electrodes 7 bored and inwardly fixed in the wall 2 just above floor level 8 and having a positive polarity, so as to cause an electroosmotic pumping of the water towards the grounds 3 along the lines of flow 9. The dimensions and number of the grounds 3 are established in accordance with the area of the plane electrode 1, the criterion being that the current density on the surface of the grounds 3 and on the bounding surface between the plane electrode 1 and the wall 2 should obey the relationship $$j_p \leq 10^{-4} \ (A/cm^2)$$

where $j_p$ is the building-directed current density on the face of the grounds (in the case of a circular section grounds corresponding to a semi-cylinder):

$$j_t \leq 0.25 \times 10^{-4} \times t^{-1} \ (A/cm^2)$$

where $j_t$ is the current density on the bounding surface between the wall and the current-carrying plaster or coating; t(cm) is the thickness of the wall to be drained, varying between 25 cm and 200 cm.

The paste for the positive electrodes may be of two compositions:

a mixture, in volumetric proportion, of one part Portland cement and 3 parts electrographite powder (grain size: 0-1 mm), including the mixing water needed to make it into a paste easily workable as plaster, which need not be more than 1 cm thick;

a mixture, which may be applied in three layers of coating, made of 4 volume parts colloidal graphite, one part polyvinyl acetate, vinyl chloride or other adequate polymer emulsion in water, and up to 2 parts of diluent water; the coating may be applied by spraying or brushing on the scraped and strongly brushed wall.

Figure 2:
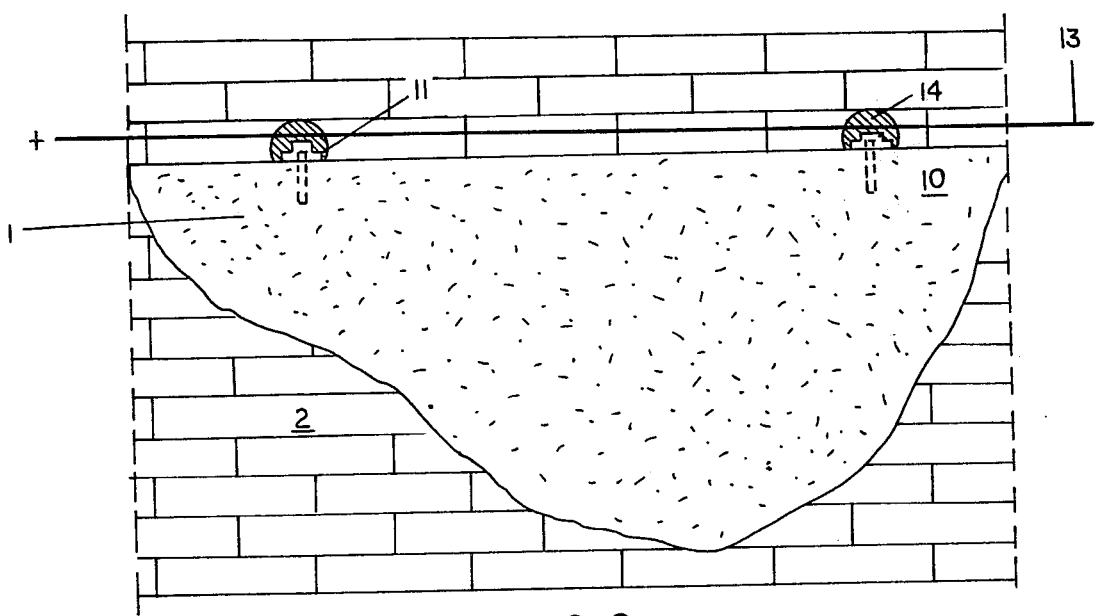
FIG. 2 is an elevation of a wall on which current-carrying plaster or a coating is applied, with the system of graphite rod contacts in place.
Figure 3:
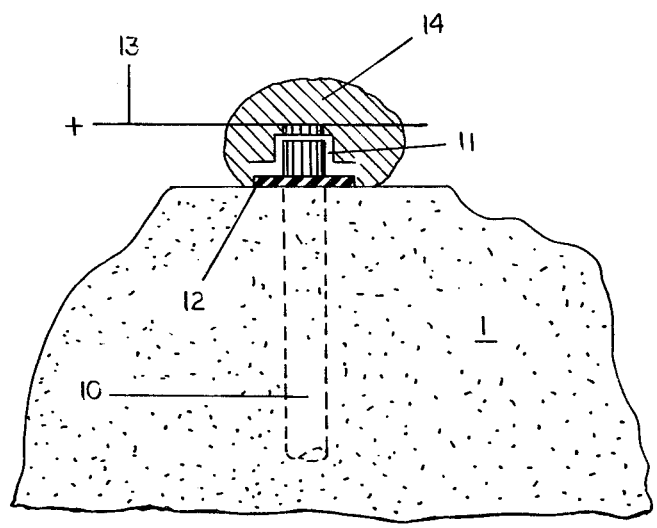
FIG. 3 is a detail of a contact shown in FIG. 2.
Figure 4:
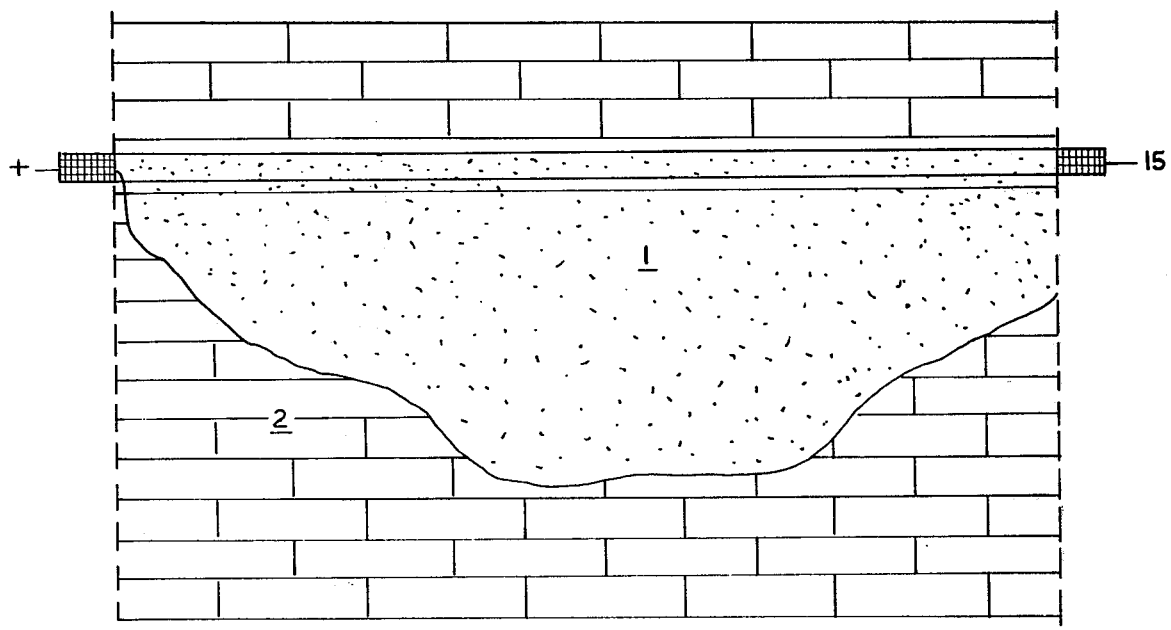
FIG. 4 is an elevation view of a wall on which current-carrying plaster or a coating is applied, with the system of corrosion-proof mesh strips or metal ribbons in place.

Feeding of a positive voltage through the current-carrying plaster or coating may be done by means of contacts of two kinds:

a number of graphite sticks 10, as shown in FIGS. 2 and 3, of about 7 mm diameter and about 7 cm in length, are completely buried in the plaster and provided with metal caps 11 and rubber washers 12 between each cap 11 and the plaster (1); a current conductor 11 welded to the cap is connected to the positive pole of the D.C. source 4, the point of weld being insulated against corrosion by means of a water-resisting epoxy paste 14;

as shown in FIG. 4 strip 15 incorrodible wire fabric (of brass or stainless steel for instance), or a 0.05-0.1 mm., is incorrodible metal tape (of copper or aluminium for instance) is buried in the current-carrying plaster or coating 1 applied to the wall 2 which is to be drained.

Figure 5:
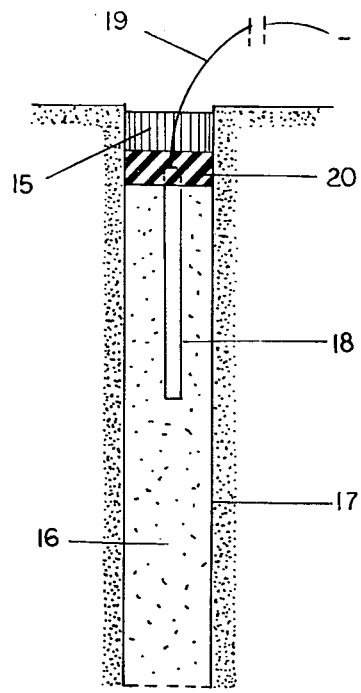
FIG. 5 is a detail of a non-metallic ground.
Figure 6:
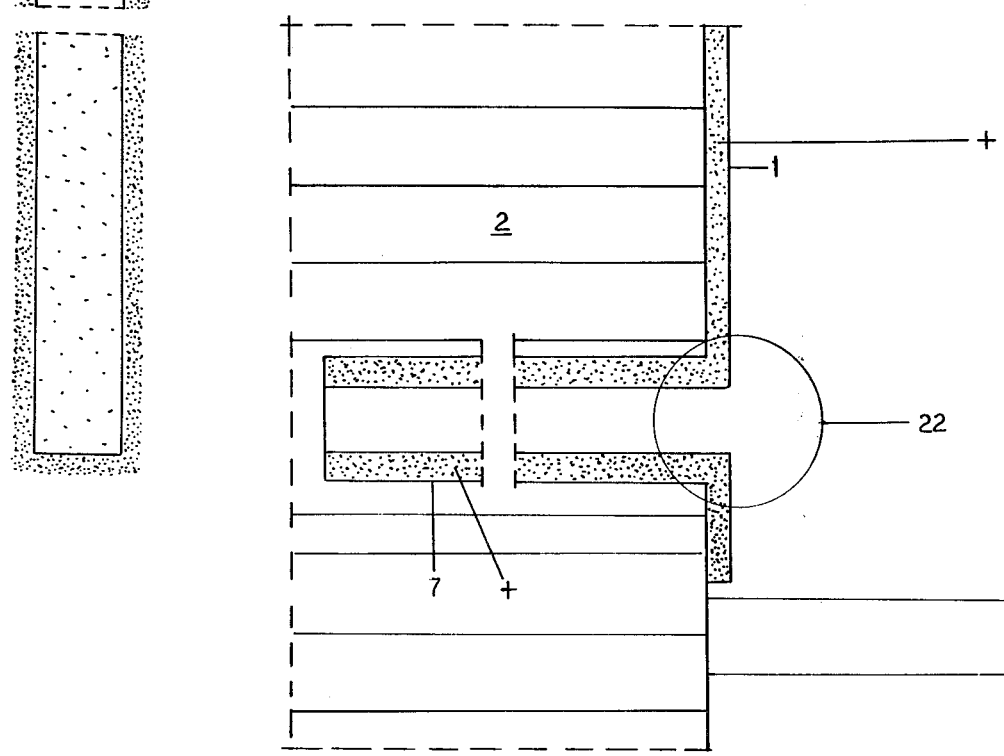
FIG. 6 is a sectional detail of the conductive contact between the current-carrying plaster or a coating and a compact or hollow cement-graphite electrode.

As shown in FIG. 5, the groundings 3, as conceived for the purpose of this method, are not made of metal but of a cement and electro-graphite powder (grain size: 0-1 mm) paste in a 1:3 volumetric proportion. This paste is poured into a hole 17 drilled manually with a drilling bit or mechanically with the appropriate equipment. The hole has a 3 to 4 in. diameter, with the length of the ground at least equal to the depth of the basement; when horizontal electrodes 7 are used against capillary lift another half-depth of the basement should be added to the length of the ground. Contact is achieved by means of a graphite or stainless steel rod 18 embedded in the paste 16. To this rod 18 is attached, by pressing, welding or soldering, a cable 19 connected to the negative pole of the D.C. source 4; the top end of contact 18 is buried in anticorrosive filler 20, along with the top of paste 16, the filler 20 in turn protected against temperature fluctuations by a concrete, clay, asphalt or other similar kind of plug 21.

To avoid cable laying for switching the electrodes 7 on, their basement end 22 is embedded directly into the current-carrying plaster or coating 1.

The advantages offered by this invention as regards the method, apparatus, electrodes and ground pastes are as follows:

it does not require costly excavations, which cause disturbances around the buildings, particularly in cities, as when the standard waterproof insulation is applied from the outside;

it eliminates the danger of electrode corrosion, as regards both plane electrodes (plaster and coatings) applied on the walls and electrodes fixed into the walls (cylindrical, compact, or hollow), as well as ground plate corrosion, since they are made of a non-metallic paste (cement-graphite or colloidal graphite-based coating);

as compared to similar methods of basement drying which use wire mesh fixed on the inside walls of the basement for electrodes, this invention uses either a current-carrying plaster, or a current-carrying coating, much more cheaply and easily applied;

the idea of embedding the ends of the electrodes drilled into the walls (for the purpose of avoiding capillary lift) into the plaster or placing them in direct contact with the coating, automatically eliminates the need for any standard electric circuit;

the combined utilization of horizontal electro-draining (by means of plaster or coatings applied on the walls) with vertical electro-draining (by means of electrodes horizontally fixed in the walls) makes standard vertical and horizontal waterproof insulations unnecessary;

it restricts the current density to just the necessary amount to control humidity; thus, it eliminates the danger of electrochemical corrosion of the electrodes and increases the reliability of operation and the serviceable life of the equipment.

I claim:

1. A method of drying damp basements by electroosmosis comprising the steps of:
   applying an electrically conductive non-metallic plaster to the inner surface of the walls of said basement to form a first electrode;
   boring a plurality of openings in the inner surface of said walls just above floor level and filling said openings with said plaster to form an extension of said first electrode;
   placing a plurality of electrically conductive non-metallic grounds in the earth around said walls of said basement to form a second electrode;
   applying a positive voltage from a D.C. power supply to said first electrode; and
   applying a negative voltage from said D.C. power supply to said second electrodes.

2. The method as described in claim 1 wherein the number of said grounds used is determined by the current density at the interface of said walls and said first electrode, the current density being less than or equal to $0.25 \times 10^{-4} \times t^{-1}$ Amps. per square cm., where it is the thickness of said wall, and the current density at the building-directed face of said grounds is less than or equal to $10^{-4}$ Amps. per square cm.

3. The method as defined in claim 2 wherein said first electrode is a three-layer coating applied to said walls and is a mixture of 4 parts colloidal graphite, 1 part polyvinyl acetate emulsion, and 2 parts water and said second electrodes are a mixture of 1 part Portland cement, 3 parts electro-graphite powder having a grain size less than 1 mm, and enough water to make an easily workable paste.

4. The method as defined in claim 1 wherein said first electrode and said second electrodes are a mixture of 1 part Portland cement, 3 parts electro-graphite powder having a grain size less than 1 mm, and enough water to make an easily workable paste.

5. The method as defined in claim 4 comprising the further steps of:
   embedding a plurality of first graphite rods in said first electrode, said rods being provided with metal caps on their exposed ends and insulating rubber washers between said caps and said first electrode;
   attaching a first conductor from the positive side of said D.C. power supply to each of said caps;
   covering said caps in a waterproof epoxy paste;
   embedding a second graphite rod in each of said second electrodes;
   attaching a second conductor from the negative side of said D.C. power supply to each of said second graphite rods;
   covering the exposed ends of said second rods with an anticorrosive filler;
   covering said filler with a temperature protective coating; and
   passing a D.C. current through the system.

6. The method defined in claim 4 further comprising the steps of:
   embedding a strip of incorrodible wire fabric in said first electrode; and
   connecting said strip to the positive side of said D.C. power supply.

7. An apparatus for drying damp basements by electroosmosis comprising:
   an electrically conductive non-metallic plaster first electrode on the inner surface of the walls of said basement;
   a plurality of openings provided in said inner surface just above floor level and filled with said plaster to form an extension of said first electrode;
   a plurality of electrically conductive non-metallic grounds in the earth around said walls forming second electrodes; and
   a D.C. power supply for feeding positive voltage to said first electrode and negative voltage to said second electrode.

8. The apparatus as defined in claim 7 further comprising:
   a plurality of first graphite rods embedded in said first electrode;
   a metal cap provided on the exposed end of each of said rods;
   an insulating rubber washer between said caps and said first electrode;
   a first conductor attached to the positive side of said power supply and each of said caps for feeding positive voltage thereto;
   a waterproof epoxy coating on each of said caps;
   a second graphite rod embedded in each of said second electrodes;
   a second conductor attached to the negative side of said power supply and each of said second rods for feeding negative voltage thereto;
   an anticorrosive filler covering the exposed end of said second electrodes; and
   a temperature protective coating covering said filler.

9. The apparatus as defined in claim 7 wherein:
   said first electrode is a 3-layer coating applied to said walls and is a mixture of 4 parts colloidal graphite, 1 part polyvinyl acetate emulsion, and 2 parts water; and
   said second electrodes are a mixture of 1 part Portland cement, 3 parts electro-graphite powder having a grain size less than 1 mm, and enough water to make an easily workable paste; and
   a strip of incorrodible wire fabric embedded in said first electrode and connected to the positive side of said power supply.

10. The apparatus as defined in claim 8 wherein:
    said first electrode and said second electrodes are a mixture of 1 part Portland cement, 3 parts electro-graphite, and enough water to make an easily workable paste; and
    the number of said second electrodes used is determined by the current density at the interface of said walls and said first electrode, the current density being less than, or equal to, $0.25 \times 10^{-4} \times t^{-1}$ Amps. per square cm., where $t$ is the thickness of said wall, and the current density at the building-directed face of said second electrodes is less than, or equal to, $10^{-4}$ Amps. per square cm.

* * * * *